United States Patent Office 2,879,292
Patented Mar. 24, 1959

2,879,292

TRANS-N,N'-DINITROSO N,N'-DIMETHYL HEXAHYDROTEREPHTHALAMIDE

Robert E. Barnhart, Hedgesville, W. Va., and Willard E. Catlin, Woodstown, N.J., assignors to E. I. du Pont de Nemours and Company, Wilmington, Del., a corporation of Delaware No Drawing. Application September 14, 1956
Serial No. 609,821

1 Claim. (Cl. 260—557)

The present invention relates to a new chemical compound. More particularly, the present invention relates to trans-N,N'-dinitroso N,N'-dimethyl hexahydroterephthalamide and to processes for making and using same.

It is an object of the present invention to prepare trans-N,N'-dinitroso N,N'-dimethyl hexahydroterephthalamide and to provide a convenient process for this purpose. Other and additional objects will become apparent from a consideration of the following specification and claim.

Trans-N,N'-dinitroso N,N'-dimethyl hexahydroterephthalamide (hereinafter referred to as "trans-NHTA"), which may be represented by the following formula:

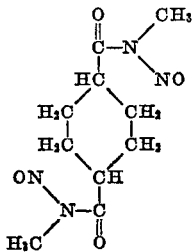

is prepared, according to my invention, by treating a nitric acid solution of the di-N-methyl amide of the corresponding acid with an inorganic nitrite. The di-N-methyl amide is prepared with methylamine from the corresponding acid chloride which, in turn, is obtained by treating the acid with phosphorus pentachloride in the well-known manner as set forth, for example, in Beilstein (Hauptwerk), vol. 9, page 734. The following example illustrates the preparation of the new compound:

*Example 1*

16 grams of trans-hexahydroterephthaloyl chloride was dissolved in 200 cc. of dry ether. Methylamine was added to the ether in excess. The resulting mixture was filtered, washed and dried. 21 grams of di-N-methyl hexahydroterephthalamide was thus obtained. To 10 grams of the latter compound was added 60 cc. of 70% nitric acid. An aqueous solution of sodium nitrite (30 grams of sodium nitrite in 60 cc. of water) was then added to the nitric acid solution. The temperature was maintained at 15–20° C. The reaction mixture was drowned in 300 cc. of water, filtered, washed with water, and dried. 5.7 grams of product was thus obtained which was identified as trans-NHTA.

The new compound is useful as a blowing agent for the preparation of cellular polyvinyl chloride materials as is illustrated by the following example:

*Example 2*

A plastisol was prepared by stirring together the following ingredients:

| | Parts |
|---|---|
| Plastisol grade polyvinyl chloride | 100 |
| "Glyptal" 2557 [1] (plasticizer) | 100 |
| Basic lead carbonate | 5 |
| Trans-NHTA | 7 |

[1] A polyadipate manufactured by the General Electric Co.

The plastisol was poured into an aluminum cup, 2½ inches in diameter and 2 inches deep, to a depth of ⅛ inch, and heated in an oven at 100° C. until it turned white. The composition was then transferred to an oven at 155° C. and heated an additional 40 minutes. The product was a white sponge having a medium-fine cell structure, and a volume 11 times that of the original plastisol.

In Example 2, any conventional monomeric plasticizer, such as di-2-ethylhexyl phthalate, may be used in lieu of the "Glyptal" 2557.

The new compound is a light yellow crystalline solid melting at 112° C. (with decomposition).

My new compound, a novel method for preparing it, and its primary use have been clearly disclosed in the foregoing specification. I intend to be limited only by the following claim.

I claim:

Trans-N,N'-dinitroso N,N'-dimethyl hexahydroterephthalamide.

References Cited in the file of this patent

UNITED STATES PATENTS

| | | |
|---|---|---|
| 2,103,286 | Zeigler | Dec. 28, 1937 |
| 2,115,576 | Goissedet | Apr. 26, 1938 |
| 2,588,885 | Schlessinger | Mar. 11, 1952 |
| 2,673,220 | Hunter | Mar. 23, 1954 |
| 2,754,326 | Bradley et al. | July 10, 1956 |
| 2,776,265 | Fuller | Jan. 1, 1957 |